United States Patent Office 3,636,090
Patented Jan. 18, 1972

3,636,090
SULFONATION OF BENZENE UNDER
SUPERATMOSPHERIC PRESSURE
John J. Luecken, East St. Louis, Ill., assignor to
Monsanto Company, St. Louis, Mo.
No Drawing. Filed Aug. 22, 1967, Ser. No. 663,474
Int. Cl. C07c 143/24
U.S. Cl. 260—505 E                                    6 Claims

ABSTRACT OF THE DISCLOSURE

A process for the preparation of benzenesulfonic acid by the sulfonation of benzene in the liquid phase with a sulfonating agent under superatmospheric pressure while passing benzene vapor through the liquid.

This invention relates to the sulfonation of benzene with a sulfonating agent to produce benzenesulfonic acid containing reduced amounts of by-products while obtaining increased utilization of the sulfonating agent. More particularly, this invention relates to the sulfonation of benzene in the liquid phase under superatmospheric pressure while passing benzene vapor through the liquid phase.

In the sulonation of benzene wherein benzene is contacted with a sulfonating agent to produce benzensulfonic acid, one of the problems is the formation of undesired by-products such as diphenyl sulfone and benzenedisulfonic acid. It has been found that the use of a high strength sulfonating agent increases the amount of by-product formation while the use of a low strength sulfonating agent decreases the reaction rate, thus adversely affecting the economical operation of the process. Multi-stage sulfonation processes are known wherein benzene is contacted in a first reaction with a sulfonating agent such as concentrated sulfuric acid or oleum to produce a mixture comprising benzenesulfonic acid and sulfuric acid together with reaction by-products and water. The water dilutes the sulfonating agent to the extent that it is no longer able to sulfonate the benzene. Separate subsequent stages are employed to further react the sulfonating agent with the benzene while reducing the water content by sparging the reaction mixture with benzene. When the concentration of the sulfonating agent is finally reduced to a low concentration, i.e., 6 to 10%, diphenyl sulfone starts to form and the reaction must be terminated to prevent the formation of large amounts of this undesired by-product. Previously, additives have been used to suppress by-products formation in the subsequent stages of the process and although such additives were used in small amounts, they remained in the product where their presence was undesirable. Even with the use of additives, sulfonating agent concentration could not be lowered below 5% to 6% weight.

It is also known that benzenesulfonic acid can be produced by contacting benzene with oleum under very high pressure in one reaction stage without the removal of water. Such a process provides a product containing at least 5% sulfuric acid and undesirable by-product. As will be more fully explained below, acid concentration as high as 5% by weight in the product is undesirable.

In a process for producing phenol, benzenesulfonic acid is produced as an intermediate which is neutralized with a base such as sodium sulfite. Because of its solubility characteristics, benzenesulfonic acid is difficult to separate from the unreacted sulfonating agent such as sulfuric acid and upon neutralization with sodium sulfite, there is produced an amount of sodium sulfate which is proportional to the amount of sulfonating agent present in the benzenesulfonic acid. Not only does the formation of sodium sulfate represent an inefficient utilization of the sulfonating agent, it is also a commercially unattractive by-product. Thus it is desirable to operate the process such that a minimum amount of sulfonating agent remains in the benzenesulfonic acid.

A process has now been discovered which utilizes nearly all of the sulfonating agent employed and avoids the formation of significant amounts of undesired by-products while employing short reaction time.

It is, therefore, an object of this invention to provide an improved process for producing benzenesulfonic acid.

Another object of this invention is to provide a process for producing benezensulfonic acid which contains a small amount of sulfonating agent.

Another object is to provide a process for producing benzenesulfonic acid having reduced amount of by-product. These and other objects will be apparent from the following description of the invention.

According to this invention there is provided an improved process for the sulfonation of benzene wherein benzene and oleum are reacted in a first reaction stage to produce a liquid sulfonation product and thereafter said product is contacted in the liquid phase with benzene vapor in at least one separate subsequent stage. The improvement comprises contacting the sulfonation product containing benzene with benzene vapor in at least one separate subsequent stage at a temperature greater than about 100° C. under a pressure greater than 80 p.s.i.g. while removing water.

The process of this invention can be operated in either a continuous or batch-wise manner.

According to the improved process of this invention, benzene is sulfonated with a mixture of benzenesulfonic acid an sulfuric acid produced in the first reaction stage. It has been found that the reaction product of benzene and oleum produced from one or more reaction stages at atmospheric pressure can be employed directly in the process of this invention without purification or treatment of any kind. The reaction product of benzene and oleum is obtained according to prior art methods for sulfonating benzene at atmospheric pressure. That is, in one or more stages, oleum of from about 20% to about 30% strength and benzene are contacted at atmospheric pressure at a temperature in the range of from about 20° C. to about 100° C. preferably from about 60° C. to about 90° C. until a reaction product containing, by weight, about 15% to about 35% sulfuric acid and from about 50% to about 80% benzenesulfonic acid is obtained. Preferably, the sulfuric acid to benzenesulfonic acid weight ratio is in the range of from 1:2 to 1:4. To the reaction product there is added benzene to provide from about 10% to about 50% by weight benzene in the resulting mixture. Such a mixture can be employed directly in the separate subsequent stages of the improved process of this invention. Alternatively, the first reaction stage can be operated such as to provide a liquid sulfonation product containing benzene, thus obviating the addition of benzene to the product.

In one or more separate subsequent stages, according to the process of this invention, benzene vapor is passed through the liquid phase comprising a liquid sulfonation product of a first reaction stage and benzene by introducing benzene as vapor at or near the bottom of the reaction vessel and allowing it to escape from the reactor at a point above the liquid level in the reactor or the process can be operated at a combination of temperature and pressure which allows a portion of the excess benzene in the liquid phase to vaporize and escape from the reactor above the liquid level. In the preferred embodiment, benzene vapor is introduced into the reaction vessel through a gas sparger at or near the bottom of the reaction vessel. The rate at which benzene is passed through the liquid phase can vary widely depending on the size of the reactor, but it has been found desirable to employ a rate which removes a substantial amount of water of reaction from the liquid phase as it is formed. The amount of water removed is proportional to the amount of benzene vapor passed through the liquid phase per unit of time. Satisfactory results are achieved by passing benzene vapor through the liquid phase at a rate which provides from about 1% to about 14%, by weight, water content in the vapor space above the liquid level in the reactor. Preferably, the rate is maintained at a level which provides from about 2% to about 8% water content in the vapor space above the liquid level in the reactor.

The temperature at which the process is operated affects the rate of sulfonation. That is the reaction rate increases as temperature increases. Thus temperatures in the range of from 100° C. to about 150° C. are useful but the rate of sulfonation is lengthy and usually temperatures in the range of from 150° C. to about 200° C. provide adequate sulfonation rates. Preferably, the process is operated at temperatures in the range of from about 170° C. to about 190° C. which provides a reaction time of from about 1 to 3 hours. Temperatures greater than 200° C. can be employed provided the reaction time is reduced.

In the operation of the process of this invention, the liquid mass is sealed in the reactor and heated. Normally, the autogenous pressure produced by such heating is adequate to provide all of the pressure required, but, if desired, pressure may be applied by introducing an inert gas such as nitrogen in the vapor space above the liquid level of the reaction vessel. Generally, pressures in excess of about 80 p.s.i.g. are desired and generally pressures in the range of from 90 p.s.i.g. to about 200 p.s.i.g. are employed. Preferably, the process is operated at pressures in the range of from about 90 p.s.i.g. to about 150 p.s.i.g. Pressures in excess of about 200 p.s.i.g. can be employed but are not preferred.

To illustrate the process of this invention, a series of runs were made utilizing a crude sulfonation product produced by reacting benzene and oleum at 25% strength at a temperature in the range of from 60° C. to about 80° C. at atmospheric pressure. The product has the following analysis by weight:

| | Percent |
|---|---|
| Sulfuric acid | 20.2 |
| Benzenesulfonic acid | 74.1 |
| Water | 5.5 |
| Diphenyl sulfones | 0.6 |
| Benzene | 0.05 |
| Benzenedisulfonic acid | <0.05 |

In these runs weighed amounts of the above described mixture were introduced into a reactor together with weighed amounts of benzene as indicated in Table I below. The reactor was sealed and heated producing an autogenous pressure as noted in Table I. Benzene vapor was passed through the liquid from the bottom of the reactor and allowed to escape from the top of the reactor at a point above the level of the liquid. The benzene vapor escaping from the reactor was condensed for reuse.

Data thus obtained are set forth in Table I below wherein parts are parts by weight.

As indicated by the data in Table I above, according to the process of the invention, benzenesulfonic acid can be produced which contains very little unreacted sulfonating agent and by-products such as sulfones and benzenedisulfonic acid. It is to be noted that the amount of benzenedisulfonic acid in the product was not greater than in the starting material indicating little or no formation of benzenedisulfonic acid in the process of this invention. Such low concentrations of acid and sulfones are particularly unexpected at the relatively high temperature of the reaction.

The product of the process of this invention contains less unreacted sulfonating agent than has been obtainable from previously known processes. The unique combination of sulfonation under pressure with benzene sparging provides conditions wherein the sulfonating agent reacts with benzene at very low concentration without producing undesirable by-products. It has been found that in the process of this invention benzene solubility in the acid phase of the reaction mixture is unexpectedly high as indicated by vapor pressure studies. Considering Raoult's law to define vapor pressure for the ideal case as expressed by the formula $$p = p(X_{Bz})$$

where:

$p$ = partial pressure of benzene over the liquid, mm. Hg
$p$ = vapor pressure of the benzene at the temperature of the liquid, mm. Hg and
$X_{Bz}$ = mol fraction of benzene in the liquid such studies have indicated that the solubility of benzene in the acid phase in the reaction mixture of the process of this invention is about five times higher than the ideal prediction. Such increased solubility results in the reaction of benzene with the sulfonating agent at relatively low concentration of the latter.

Although the above examples were carried out in a batch type operation, the process can be operated in a continuous manner by adding the benzene and the first stage reaction product simultaneously and continuously under pressure into a reaction vessel of sufficient size to provide a hold time required for the sulfonation of benzene and continuously removing the reaction product.

The process of this invention can also be operated in a multi-stage system wherein benzene is sulfonated in a consecutive series of pressurized reactors while in each reactor benzene vapor is passed through the liquid phase. In such a process, benzene and the sulfonating agent are introduced into a first reactor at atmospheric pressure to produce a mixture which contains from about 40% to about 60% by weight, benzenesulfonic acid. The reaction mixture is then passed through two to five succeeding pressurized reactors. If necessary an excess of benzene is maintained by adding benzene between the first and second reactors so as to provide a feed to the second reactor which contains from about 10% to about 40%, by weight, benzene. The second and subsequent reactors are operated at a temperature and pressure as described above. The flow rate and reactor size are regulated so as to produce a total reaction time of from 1 to about 3 hours. The effluent from the last pressurized reactor contains about 2% sulfuric acid and trace amounts of byproducts. The multi-stage process is best suited for continuous operation.

TABLE I

| Crude sulfonation product | Benzene (parts) | Temp. (° C.) | Pressure (p.s.i.g.) | Benzene vapor flow rate (parts/min.) | Heat-up time (min.) | Reaction time (min.) | Product analysis, wt./percent | | |
|---|---|---|---|---|---|---|---|---|---|
| | | | | | | | $H_2SO_4$ | Diphenyl sulfones | Benzenedisulfonic acid |
| 600 | 192 | 180 | 120 | 10.2 | 60 | 150 | 1.8 | 2.2 | .05 |
| 600 | 192 | 180 | 135 | 16.1 | 60 | 180 | 1.2 | 2.1 | .05 |
| 600 | 192 | 180 | 130 | 7.5 | 60 | 120 | 1.6 | 1.6 | .05 |

While this invention has been described by reference to various specific examples and embodiments, it is to be understood that the invention is not limited thereto and that it can be variously practiced within the scope of the following claims.

The embodiments of this invention in which an exclusive property or privilege is claimed are defined as follows:

1. A process for sulfonating benzene which comprises reacting benzene and oleum in a first reaction stage to produce a sulfonation mixture comprising benzenesulfonic acid, sulfuric acid and benzene, adding benzene to said mixture to provide from about 10% to about 50% by weight benzene in the resulting mixture, and passing benzene vapor through said resulting mixture in at least one subsequent reaction stage at a reaction temperature greater than about 100° C. under a pressure greater than about 80 p.s.i.g. while removing water from the reaction mass.

2. A process for sulfonating benzene which comprises reacting benzene and oleum in a first reaction stage to produce a sulfonation mixture comprising benzenesulfonic acid, sulfuric acid and benzene, adding benzene as may be necessary to provide an amount of benzene in the resulting mixture in the range of from about 10% to about 40% by weight, and passing benzene vapor through said mixture in at least one subsequent reaction stage at a reaction temperature greater than about 100° C. under a pressure greater than about 80 p.s.i.g. while removing water from the reaction mass.

3. A process of claim 2 wherein the sulfuric acid to benzenesulfonic acid in the sulfonation mixture is in the weight ratio of from about 1:2 to about 1:4.

4. A process of claim 2 wherein the temperature is in the range of from about 170° C. to about 190° C.

5. A process of claim 2 wherein the pressure is in the range of from about 90 p.s.i.g. to about 150 p.s.i.g.

6. A process of claim 2 wherein benzene vapor is passed through the sulfonation mixture in from 2 to 5 separate reaction stages.

References Cited

UNITED STATES PATENTS

| | | | |
|---|---|---|---|
| 1,210,725 | 1/1917 | Tyrer | 260—505 E |
| 2,692,279 | 10/1954 | Molinari et al. | 260—505 E |
| 2,389,041 | 11/1945 | Gould | 260—505 E X |
| 2,697,117 | 12/1954 | Joseph et al. | 260—505 E |
| 3,246,026 | 4/1966 | Sowerly et al. | 260—505 S X |

LEON ZITVER, Primary Examiner

L. DeCRESCENTE, Assistant Examiner